United States Patent Office 3,535,313
Patented Oct. 20, 1970

3,535,313
N'-SUBSTITUTED N-ARYLSULFONYL UREA
Henri Dietrich, Arlesheim, Basel-Land, Switzerland, assignor to Geigy Chemical Corporation, Ardsley, N.Y., a corporation of New York
No Drawing. Filed July 6, 1967, Ser. No. 651,363
Claims priority, application Switzerland, July 12, 1966, 10,126/66
Int. Cl. A61k 27/00; C07d 39/06
U.S. Cl. 260—239.8     3 Claims

ABSTRACT OF THE DISCLOSURE

N - (p-aminophenylsulfonyl) - 2 - aza-bicyclo[2,2,2]octane-2-carboxamide which has a useful hypoglycaemic action and an intermediate for its production; therapeutical compositions containing this amide and processes of producing a hypoglycaemic effect in a mammal.

---

The invention relates to a N'-substituted N-arylsulfonyl urea which has valuable pharmacological properties. More particularly the invention pertains to N-(p-aminophenylsulfonyl) - 2 - aza - bicyclo[2,2,2]octane-2-carboxamide and to addition salts thereof with bases, which show a hypoglycaemic action. The invention is further concerned with processes for the production of this compound and these addition salts as well as with an intermediate used in such process. Furthermore, the invention relates to therapeutical compositions consisting essentially of (1) N-(p-aminophenylsulfonyl)-2-aza-bicyclo[2,2,2]octane-2-carboxamide or a pharmaceutically acceptable addition salt thereof with a base and (2) a pharmaceutical carrier, and also to processes of producing a hypoglycaemic effect in a mammal by administering to said mammal a hypoglycaemically effective amount of N-(p-aminophenylsulfonyl) - 2 - aza - bicyclo[2,2,2]octane-2-carboxamide or of a pharmaceutically acceptable addition salt thereof with a base.

The compound of the formula

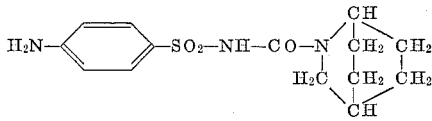

as well as its addition salts with inorganic or organic bases, have not been known up to now. This compound as well as the addition salts thereof with inorganic or organic bases have on oral or parenteral administration a hypoglycaemic action which characterises them as suitable for the treatment of diabetes.

Merely by way of illustration, the hypoglycaemic action of N - (p - aminophenylsulfonyl) - 2-aza-bicyclo[2,2,2]octane-2-carboxamide, for instance, is determined as follows:

The substance is suspended in tap water with the aid of tragacanth and is administered by means of a stomach sound in an amount of 20 mg./kg. of body weight. Five rats of an average weight of 180 g. which have not been fed for 13½ hours before the start of the test, are used as test animals. Blood samples are taken from the tail vein of the animals immediately before, and 1½, 3, 5½ and 7½ hours after, administration of the test substance. The blood sugar is determined according to Hagedorn-Jensen, Biochemische Zeitschrift 135, 46 (1923). The hypoglycaemic action as shown by N-(p-aminophenylsulfonyl) - 2 - aza - bicyclo[2,2,2]octane-2-carboxamide in this test is considerably good.

The inventive compound of the above formula is produced according to the invention by reacting an isocyanate derivative of the formula

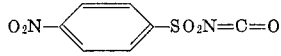

or a reactive functional derivative of a carbamic acid of the formula

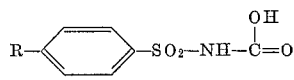

wherein R represents the amino group or it represents a radical which can be converted into an amino group by hydrolysis, reduction or reductive cleavage, with 2-aza-bicyclo[2,2,2]octane or with an alkali metal derivative of this compound, the reaction being performed, if desired, in the presence of a condensing agent and, preferably, in an inert solvent, if necessary, hydrolysing or reducing the reaction product obtained to convert the group R into the free amino group and, if desired, converting the reaction product obtained into a salt with an inorganic or organic base.

As reactive functional derivatives of carbamic acids of the above formula, their halides, particularly the chlorides, and their low alkyl esters, particularly the methyl or ethyl ester, also the phenyl esters, for example, are used. Also amides, low alkylamides, dialkylamides, diphenylamides, particularly N-methylamides, N,N-dimethylamides and, also N-acylamides such as benzoyl amide, are suitable.

As examples of such functional derivatives can be named: e.g. by the radical R substituted N-phenylsulfonyl carbamic acid chloride, N-phenylsulfonyl carbamic acid-methyl ester, -ethyl ester and -phenyl ester, N-phenylsulfonyl urea, N-methyl-N'-phenylsulfonyl urea, N,N-dimethyl-N'-phenylsulfonyl urea, N,N-diphenyl-N'-phenylsulfonyl urea as well as N-benzoyl-N' phenylsulfonyl urea.

The reaction is performed, e.g. in the cold or by heating in an inert organic solvent. Suitable inert organic solvents are, e.g. hydrocarbons such as benzene, toluene or xylene, ether-type liquids such as diethyl ether, dioxane or tetrahydrofuran, chlorinated hydrocarbons such as methylene chloride, and low ketones such as acetone or methylethyl ketone.

The reaction of an isocyanate, carbamic acid ester, or urea, can also be performed in the absence of solvents or diluents. Also, in general, no condensation agent is needed; if desired, however, an alkali alcoholate for example can be used as such agent. Tertiary organic bases can be used as other condensing agents in the reaction of an isocyanate; isocyanates, however, can also be used in the form of an addition product with a tertiary organic base.

A carbamic acid halide is reacted according to the invention with a free base, preferably in the presence of an acid binding agent. As such, inorganic bases or salts are used, e.g. an alkali hydroxide, acetate, hydrogen carbonate, carbonate and phosphate such as sodium hydroxide, sodium acetate, sodium hydrogen carbonate, sodium carbonate and sodium phosphate or the corresponding potassium compounds. Also calcium oxide, carbonate or phosphate and magnesium carbonate can be used. Instead of inorganic bases or salts, also organic bases are suitable such as pyridine, trimethylamine or triethylamine, N,N-di-isopropylamine, triethylamine or collidine. In excess, these can also be used as solvents. Instead of 2-aza-bicyclo[2,2,2]octane, an alkali metal derivative of this base such as a sodium, potassium or lithium derivative, can be used for the reaction according to the invention with a carbamic acid chloride.

The conversion of a group R of the reaction product into the free amino group, which converts this into the inventive compound, is performed by hydrolysis, reduction or reductive cleavage depending on the type of the group R.

Radicals R which can be converted by hydrolysis into the free amino group are, e.g. acylamino radicals such as the acetamido group, or alkoxy- or phenoxy-carbonylamino radicals such as the ethoxycarbonylamino or phenoxycarbonylamino group. Other examples are substituted methylene amino radicals such as the benzylidene amino or the p-dimethylamino-benzylidene amino group. The hydrolysis to liberate the amino group can be performed, e.g. in an acid medium such as by heating in dilute methanolic hydrochloric acid or, when R is an alkoxy- or phenoxy-carbonylamino radical, also under mild alkaline conditions, e.g. with 1 N to 2 N sodium hydroxide solution. The hydrolysis is performed at room temperature.

An example of a radical R which can be converted by reduction into the amino group is the nitro group; the respective intermediate, p-nitrophenylsulfonyl-2-aza-bicyclo[2,2,2]octane-2-carboxamide, obtained according to the above described processes, is new and forms part of the invention.

Examples of those radicals which can be converted by reductive cleavage into the amino group are the phenylazo or p-dimethylaminophenyl-azo groups. The reduction of these radicals can generally be performed catalytically, e.g. by means of hydrogen in the presence of Raney nickel, palladium or platinum charcoal, in an inert solvent such as ethanol. In addition to these, also other reduction processes can be used, e.g. the reduction of the nitro group or the reductive cleavage of azo groups with the aid of iron in acetic or hydrochloric acid.

The new active substance or the pharmaceutically acceptable salts thereof are preferably administered orally. Inorganic or organic bases such as alkali or alkaline earth hydroxides, carbonates or bicarbonates, triethanolamine, choline, $N^1$-dimethyl- or $N^1$-($\beta$-phenylethyl)-biguanide, can be used for the salt formation. The daily dosages will, of course, vary with the mammal under treatment and may, for example, range between 100 and 2,000 mg. Suitable dosage units of the pharmaceutical compositions according to the invention, such as dragees (sugar coated tablets), tablets, preferably contain 100–500 mg. of an active substance according to the invention, actually 20–80% of the inventive compound or of a pharmaceutically acceptable addition salt thereof with a base. They are produced by combining the active substance with, e.g. solid pulverulent carriers such as lactose, saccharose, sorbitol, mannitol; starches such as potato starch, maize starch or amylopectin, also laminaria powder or citrus pulp powder: cellulose derivatives or gelatine, optionally with the addition of lubricants such as magnesium or calcium stearate or polyethylene glycols (Carbowaxes) of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

The following prescriptions further illustrate the production of tablets and dragees:

(a) 1,000 g. of N-(p-aminophenylsulfonyl)-2-aza-bicyclo[2,2,2]octane-2-carboxamide are mixed with 550 g. of lactose and 292 g. of potato starch. The mixture is moistened with an aqueous solution of 8.0 g. of gelatine and granulated through a sieve. After drying, 60.0 g. of potato starch, 60.0 g. of talcum, 10.0 g. of magnesium stearate and 20.0 of colloidal silicon dioxide are mixed in and the mixture is pressed into 10,000 tablets each weighing 200 mg. and containing 100 mg. of active substance. If desired, the tablets can be grooved for better adaptation of the dosage.

(b) A granulate is produced from 1,000 g. of N-(p-aminophenylsulfonyl) - 2 - aza - bicyclo[2,2,2]octane-2-carboxamide, 379 g. of lactone and the aqueous solution of 6.0 g. of gelatine. After drying, the granulate is mixed with 10.0 g. of colloidal silicon dioxide, 40.0 g. of talcum, 60.0 g. of potato starch and 5.0 g. of magnesium stearate and the mixture is pressed into 10,000 dragee cores. These are then coated with a concentrated syrup made from 533.5 g. of crystallised saccharose, 20.0 g. of shellac, 75.0 g. of gum arabic, 250 g. of talcum, 20 g. of colloidal silicon dioxide and 1.5 g. of dyestuff and dried. The dragees obtained each weigh 240 mg. and contain 100 mg. of active substance.

The following non-limitative examples further illustrate the invention. The temperatures are given in degrees centigrade, percentages are given by weight.

EXAMPLE 1

22.8 g. of p-nitro-phenyl sulfonyl isocyanate are added to 11.1 g. of 2-aza-bicyclo[2,2,2]octane in 500 ml. of anhydrous dioxane and, on completion of the exothermic reaction, the crude p-nitrophenylsulfonyl-2-aza-bicyclo [2,2,2]octane-2-carboxamide obtained is dissolved in dioxane and hydrogenated with hydrogen at 20° under normal pressure, in the presence of palladium charcoal (50%) until no more hydrogen is taken up. The catalyst is filtered off and the solution is evaporated to dryness in vacuo. The N - (p-aminophenylsulfonyl)-2-aza-bicyclo[2,2,2]octane-2-carboxamide crystallises from acetone/water and it decomposes at 167°.

EXAMPLE 2

21.4 g. of p-aminophenylsulfonyl urea and 11.1 g. of 2-aza-bicyclo[2,2,2]octane in 600 ml. of anhydrous dioxane are refluxed for 8 hours while stirring vigorously. Ammonia is developed. The solutioin is then concentrated in vacuo into a brown oil to which a small amount of water is added whereupon the product crystallises. Recrystallised from ethanol, the pure N-(p-aminophenylsulfonyl) - 2 - aza - bicyclo[2,2,2]octane - 2 - carboxamide obtained decomposes at 167°.

What is claimed is:

1. N - (p - aminophenylsulfonyl) - 2 - aza - bicyclo [2,2,2]octane-2-carboxamide.

2. A pharmaceutically acceptable addition salt of the compound as claimed in claim 1 with a base.

3. p - Nitrophenylsulfonyl - 2 - aza - bicyclo[2,2,2]octane-2-carboxamide.

References Cited

UNITED STATES PATENTS 3,334,302  8/1967  Beregi et al. _____ 260—397.7
3,438,976  4/1969  Jucker et al. _____ 260—239.6

OTHER REFERENCES

C. A. 64:37787a, Scherico, Ltd., February 1967.

HENRY R. JILES, Primary Examiner

C. M. SHURKO, Assistant Examiner

U.S. Cl. X.R.

260—207.1, 239.65, 293, 397.6, 397.7; 424—229